(12) United States Patent
Faraz et al.

(10) Patent No.: US 9,915,990 B2
(45) Date of Patent: Mar. 13, 2018

(54) PERSISTENT POWER OVER ETHERNET

(71) Applicant: CISCO TECHNOLOGY, INC., San Jose, CA (US)

(72) Inventors: Ahmed Faraz, Saharanpur (IN); Krishna Kumar Vavilala, Bangalore (IN); Kabiraj Sethi, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 140 days.

(21) Appl. No.: 14/474,356

(22) Filed: Sep. 2, 2014

(65) Prior Publication Data
US 2016/0062432 A1    Mar. 3, 2016

(51) Int. Cl.
G06F 1/26       (2006.01)
H04L 12/10      (2006.01)
H04L 12/40      (2006.01)
H04L 12/413     (2006.01)

(52) U.S. Cl.
CPC .............. *G06F 1/266* (2013.01); *H04L 12/10* (2013.01); *H04L 12/40045* (2013.01); *H04L 12/413* (2013.01)

(58) Field of Classification Search
None
See application file for complete search history.

(56) References Cited

U.S. PATENT DOCUMENTS

| | | |
|---|---|---|
| 7,337,336 B2 | 2/2008 | Ferentz et al. |
| 7,774,628 B2 | 8/2010 | Hansalia |
| 8,479,043 B2 | 7/2013 | Diab |
| 2004/0230846 A1 | 11/2004 | Mancey et al. |
| 2006/0186739 A1* | 8/2006 | Grolnic ............. G06F 1/30 307/64 |
| 2008/0235527 A1* | 9/2008 | Heller ............. G06F 1/3203 713/320 |

(Continued)

FOREIGN PATENT DOCUMENTS

EP         2701338 A1    2/2014

OTHER PUBLICATIONS

International Search Report and Written Opinion for International Application No. PCT/US2015/048129, dated Nov. 9, 2015, 12 pages.

(Continued)

*Primary Examiner* — Paul J Yen
(74) *Attorney, Agent, or Firm* — Patterson + Sheridan, LLP

(57) ABSTRACT

Embodiments described herein improve availability of a power plane in a network device by using a PoE manager that is separate from an operating system in the network device. For example, when the operating system (or a PoE application executing in the operating system) becomes unavailable, either because of failure or system upgrade, the PoE manager continues managing a power plane in the network device such that connected PDs continue to receive DC power. Stated differently, by using a PoE manager that is separate from the operating system, there is no fate sharing between the PoE manager and the operating system. If the operating system is unavailable, the PoE manager continues to provide the same power allotment to the PDs. As such, updates and failures which previously made the power plane unavailable no longer affect the power supplied to the PDs.

20 Claims, 6 Drawing Sheets

(56) References Cited

U.S. PATENT DOCUMENTS

| | | | |
|---|---|---|---|
| 2008/0294917 A1 | 11/2008 | Khan et al. | |
| 2011/0208980 A1* | 8/2011 | Brooks | G06F 1/266 |
| | | | 713/300 |
| 2011/0307112 A1 | 12/2011 | Barrilleaux | |
| 2012/0131372 A1* | 5/2012 | Hibi | H04L 12/10 |
| | | | 713/340 |
| 2012/0173899 A1* | 7/2012 | Swindell | G06F 1/266 |
| | | | 713/310 |
| 2012/0246458 A1 | 9/2012 | Jain et al. | |
| 2013/0214759 A1 | 8/2013 | Chen et al. | |

OTHER PUBLICATIONS

Cisco Catalyst 3750 Series Switches, pp. 1-22, 2009, Cisco Systems, Inc. San Jose, United States, <http://www.cisco.com/c/en/us/products/collateral/switches/catalyst-3750-series-switches/product_data_sheet0900aecd80371991.pdf>.

Cisco Catalyst 2960-S and 2960 Series Switches with LAN Base Software, pp. 1-28, 2013, Cisco Systems, Inc. San Jose, United States, <http://www.cisco.com/c/en/us/products/collateral/switches/catalyst-2960-series-switches/product_data_sheet0900aecd80322c0c.pdf>.

* cited by examiner

PERSISTENT POWER OVER ETHERNET

TECHNICAL FIELD

Embodiments presented in this disclosure generally relate to improving availability of Power over Ethernet (PoE) systems. More specifically, embodiments disclosed herein maintain PoE functions during a period of time when the operating system of a network device is unavailable.

BACKGROUND

Some network devices (e.g., router, switch, server, and the like) include power sourcing equipment (PSE) that enables the network device to provide both data and power over the same Ethernet cable to a powered device (PD). A recent trend is to communicatively couple consumer products (e.g., appliances, lighting fixtures, exercise machines, etc.), environmental controls (e.g., thermostats, meters, pumps, etc.), and many other types of components to the Internet. Providing such connectivity is referred to generally as the Internet of Things or more broadly as the Internet of Everything. One example of achieving this connectivity is by using network devices to both provide a data connection as well as DC power to the consumer products, environmental controls, and the like.

However, updating software or hardware executing in the network devices may cause data and power interruptions in the connected PDs. That is, because the PoE application is executed by the operating system, if the operating system is unavailable while being upgraded, then the PoE application is also unavailable thereby preventing the network device from providing data communication and power to the PD. Although losing the data connection may be acceptable since the PD can continue to operate in its current state, losing the power connection may cause a safety hazard. For example, if the PD is a light fixture in a house, then losing the data connection simply means the light remains in its current state (e.g., "on" or "off"). But if the light relies on the network device for power, then the light is forced to turn off. Doing so may cause a safety hazard for someone in the home who is currently using the light to, for example, navigate a flight of stairs.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DESCRIPTION OF EXAMPLE EMBODIMENTS

Overview

Figure 1:
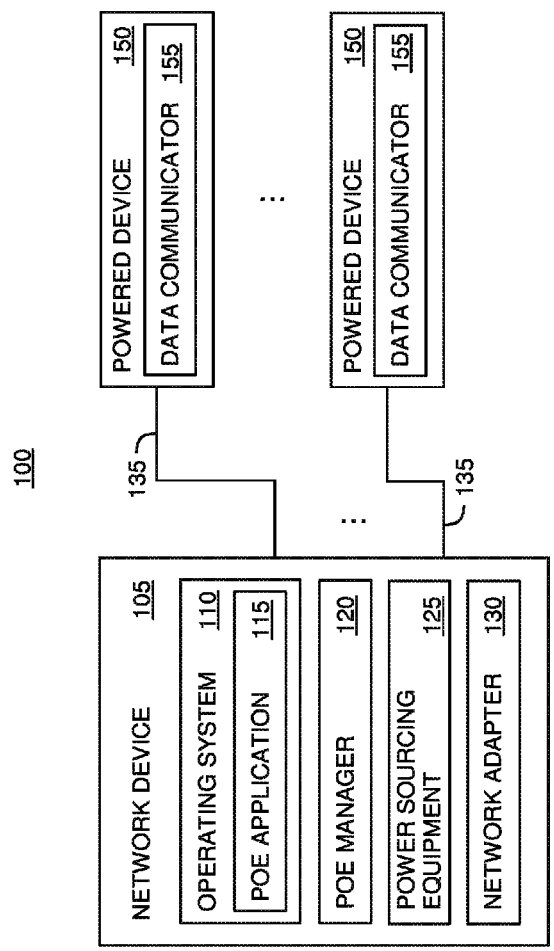
FIG. 1 is a PoE system with separate PoE modules in a network device, according to one embodiment described herein.

One embodiment presented in this disclosure is a PoE enabled network device that includes power sourcing equipment (PSE) configured to provide DC power to powered devices (PDs) and an operating system configured to maintain a data plane for routing data through the network device. The network device also includes a PoE manager configured to maintain, at least in part, a power plane for supplying DC power to the PDs where the PoE manager is operated independently of the operating system such that when the operating system is unavailable, the PoE manager still supplies power to the PDs using the PSE.

Another embodiment in the present disclosure is a PoE system that includes a PD, an Ethernet cable, and a PoE enabled network device coupled to the PD via the Ethernet cable. The network device includes a PSE configured to provide DC power to the PD via the Ethernet cable and an operating system configured to maintain a data plane for routing data to the PD using the Ethernet cable. The network device also includes a PoE manager configured to maintain, at least in part, a power plane for supplying PoE to the PDs where the PoE manager is operated independently of the operating system such that when the operating system is unavailable, the PoE manager still supplies power to the PDs using the PSE.

Another embodiment presented in this disclosure is a method that includes determining an allocation of power for a PD coupled to a network device and providing the allocated power to the PD using a PoE manager and PSE in the network device. The PoE manager maintains, at least in part, a power plane for supplying DC power to the PD. The method also includes operating the PoE manager independently of an operating system of the network device such that when the operating system is unavailable, the PoE manager and PSE continue to provide DC power to the PD.

Example Embodiments

Embodiments described herein improve availability of a power plane in a network device by using a PoE manager that is separate from an operating system in the network device. For example, when the operating system (or a PoE application executing in the operating system) becomes unavailable, either because of a failure or a system upgrade, the separate PoE manager is able to continue operating the power plane such that connected PDs continue to receive DC power from the network device. Stated differently, by using a PoE manager that is operated independently of the operating system, there is no fate sharing between the PoE manager and the operating system. In one embodiment, if the operating system is unavailable, the PoE manager continues to provide the same power allotment to the PDs. As such, updates and failures which previously made the power plane unavailable no longer affect the power supplied to the PDs.

In one embodiment, the PoE manager is executed by a different hardware module than the hardware module executing the operating system of the network device. For example, the network device may include two processors. One processor is assigned to execute the operating system while a second, independent processor executes the PoE manager. Thus, even if the processor assigned to the operating system reboots or is otherwise unavailable, the PoE manager continues to deliver power to the connected PDs.

In another embodiment, the PoE manager and operating system may be separate processes executing on the same processor. That is, the PoE manager operates independently of the operating system. Thus, even if the operating system is unavailable, the processor can continue to execute the PoE manager which maintains the power plane in a functional state.

In one embodiment, the network device may include a communication link between the PoE manager and the operating system. Using this link, the operating system can provide, for example, updated power allocation data to the PoE manager so the manager can maintain the power plane in case the operating system becomes unavailable. Additionally, the PoE manager may use the communication link to inform the operating system of any status changes that occurred when the operating system was unavailable.

FIG. 1 is a PoE system 100 with separate PoE modules in a network device 105, according to one embodiment described herein. The network device 105 is coupled to a plurality of PDs 150 which represents any type of device capable of receiving DC power using PoE. For example, the PDs 150 may be consumer products, environmental controls, electronic devices, and the like. As shown, the PDs 150 include a data communicator 155 which enables data communication via the Ethernet cables 135. That is, in this embodiment, the network device 105 enables data communication as well as provides power to the PDs 150. Using the data communicators 155, the PDs 150 can receive data packets from, as well as transmit data packets to, the network device 105. In one embodiment, the PoE system 100 is part of the Internet of Everything or the Internet of Things. For example, the PD 150 may be a light fixture in a home. The network device 105 may include an application that turns the light fixture on and off. At sunset, the application may send an instruction to the data communicator 155 that turns the light fixture on. Moreover, when the home owner turns off the light (e.g., when the owner goes to bed) the data communicator 155 may transmit a data message to the network device 105. Based on historical information, the application may identify when the home owner goes to bed, and if the home owner does not turn off the light, the network device 105 can do it for her. Nonetheless, although FIG. 1 illustrates that the network device 105 and PDs 150 share data messages over the Ethernet cables 135, in other embodiments the network device 105 may provide only power to the PDs 150 using PoE.

The network device 105 includes an operating system (OS) 110, PoE manager 120, power sourcing equipment (PSE) 125, and a network adapter 130. The OS 110 may be any OS capable of performing the functions described herein, and in one embodiment, OS 110 is the only OS in the network device 105. The OS 110 may establish a data plane for forwarding data between devices connected to the network device 105. Furthermore, the OS 110 may maintain a control plane to manage the flow of the data traffic in the data plane. The OS 110 includes a PoE application 115 for performing PoE functions in the network device 105. For example, the PoE application 115 may perform one of the PoE functions detailed in the IEEE standards 802.3af or 802.03at such as allocating the power supplied by the PSE 125 between the PDs 150.

In addition to the PoE application 115, the network device 105 includes the PoE manager 120 that operates independently of the PoE application 115 and/or the operating system 110. As used herein, "operating independently" means the PoE manager 120 can continue to perform its function even if the PoE application 115 and/or the operating system 110 become unavailable either because of an unexpected failure or a planned software update. Like the PoE application 115, the PoE manager 120 also performs PoE functions in the network device 105. However, the PoE manager 120 may perform a different PoE function than the PoE application. For example, while the PoE application 115 determines how much power is allocated to each PD 150, the PoE manager 120 delivers the power to the PDs 150 using the PSE 125 and ensures that the PDs 150 are not consuming more power than they are allotted. Thus, because the PoE manager 120 is separate and independent from the PoE application and the OS 110, even if these components become unavailable, the PoE manager 120 can continue to deliver power to the PDs 150. Moreover, together the PoE application 115 and PoE manager 120 manage the power plane in the network device 105. Because the PoE manager 120 is operated independently of the OS 110, this means at least part of the power plane is independent of the control plane maintained by OS 110. Thus, if the control plane is unavailable, at least part of the power plane (i.e., the PoE functions performed by PoE manager 120) is still available.

The PSE 125 is the physical power supply that is, at least in one embodiment, controlled by the PoE manager 120 to deliver power to the PDs 150. The PSE 125 may include an AC-DC converter that converts the AC power into DC power. As shown, the PSE 125 provides the specific DC power that is allotted to each of the PDs via the Ethernet cables 135.

In addition to providing power on the cables 135, the network adapter 130 may transmit and receive data signals on the cables 135. Thus, network device 105 may mix the data signal with power signals in order to simultaneously deliver power and data messages to the PDs 150 using the cables 135. However, in other embodiments, the cables 135 may be used to deliver only power, and not data, to the PDs 150.

Figure 2:
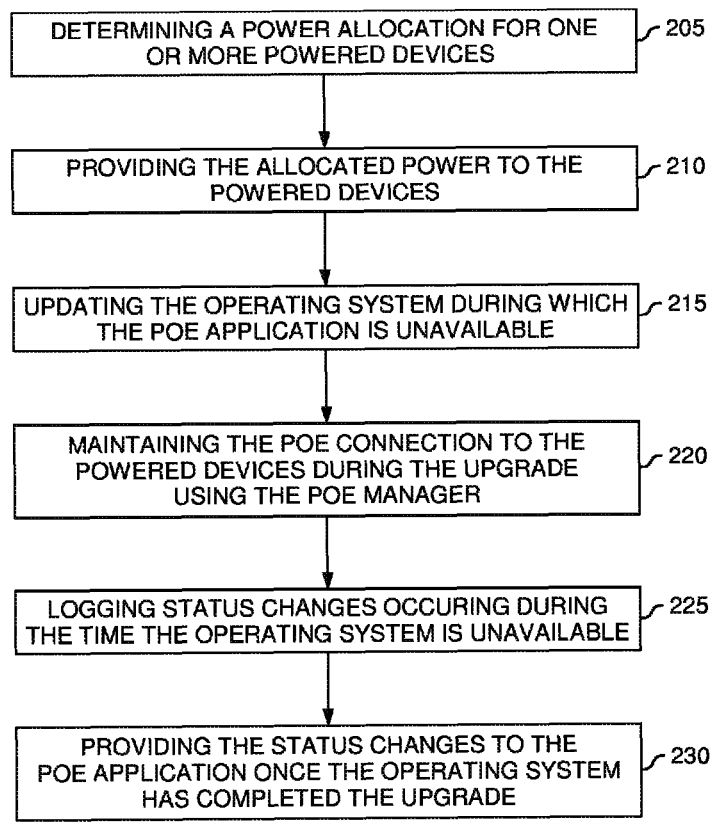
FIG. 2 is flow chart for improving the availability of PoE, according to one embodiment described herein.

FIG. 2 is flow chart of a method 200 for improving the availability of PoE, according to one embodiment described herein. At block 205, a PoE application executing in the operating system of a PoE-enabled network device determines a power allocation for one or more PDs which may occur after the PDs have been discovered and classified. To determine how much power to allocate to the PDs, the PoE application may communicate with the PDs using Link Layer Discovery Protocol (LLDP) which is vendor neutral communication protocol or use a proprietary protocol such as Cisco Discovery Protocol (CPD). The PDs may send requests for specific amounts of power using the communication protocol. The PoE application then determines whether it can fulfill the request based on, e.g., the number of connected PDs, priority amongst the PDs, available power remaining, and the like. Regardless of the criteria considered, at the end of the negotiation process, the PoE application determines the specific amount of power to be supplied to the PD using the PSE (e.g., 15.5 watts). In one embodiment, the PoE application ensures that that PDs are not allocated more power than can be provided by the PSE.

At block 210, the PoE application informs the PoE manager of the power allocation determined at block 205. Using this information, the PoE manager instructs the PSE to provide the allocated power to the connected PDs. Stated differently, while in this embodiment the PoE application is tasked with negotiating with the PDs to determine the amount of power allocated to each PD, the PoE manager actually takes the steps necessary to provide the allocated power to the PD. In addition, the PoE manager may police the power connection between the PSE and the PDs to ensure the PDs are not consuming more power than they were allotted by the PoE application. If so, the PoE manager may instruct the PSE to stop providing power to a PD, or send a message to the PoE application to renegotiate the power allocated to the PD.

At block 215, the network device updates the OS which results in the PoE application becoming unavailable. In another embodiment, the network device may update only the PoE application (rather than the OS as a whole) which may make the PoE application unavailable. Furthermore, although method 200 describes purposively making the PoE application unavailable, the techniques described herein apply equally to unexpected failures of the OS and the PoE application.

While the PoE application is unavailable, at block 202, the PoE manager is still able to supply DC power to the PDs using the PSE. That is, the PoE manager is operated independently of the PoE application executing in the OS. As described above, the PoE application and PoE manager may be configured to perform different PoE functions. In one embodiment, the PoE functions necessary to maintain a PoE power connection are assigned to the PoE manager while all other PoE functions are assigned to the PoE application. For example, once the PDs begin pulling power from the network device, negotiating the power allocation is not critical to maintaining the power delivery. Thus, this function may be performed by the PoE application. Alternatively, rather than a subset of the PoE functions being performed by the OS using the PoE application, in one embodiment, all of the PoE functions may be performed by an independent PoE manager that operates independently of the OS. Thus, if the OS is unavailable, the independent PoE manager continues to deliver power to the PDs.

At block 225, the PoE manager logs status changes (e.g., PoE events) occurring when the OS or PoE application is unavailable. For example, the PoE manager may determine during block 225 that one of the PDs is disconnected from the network device or that a new PD is connected to the network device. Because the PoE application is not currently executing, the PoE manager stores this event to update the PoE application when it is again available.

At block 230, the PoE manager provides the status changes to the PoE application once the PoE application is again available. In one embodiment, the PoE manager and PoE application may share a communication link that allows the two computing components to send messages. The PoE application may use the communication link at block 205 to inform the PoE manager of the power allocated to each of the PDs. The PoE manager may in turn use the communication link to provide updates to the PoE application when a PD is drawing more than the allocated power, a PD is disconnected from the network device, or a new PD is connected to the network device. If the PoE application is unavailable, the PoE manager may store or queue any update messages until the PoE application is again available.

In another embodiment, the network manager may include a shared memory where the PoE application and PoE manager can post updates and share information. For example, when the PoE application becomes available after an update or failure, the application may poll the shared memory region to see if the PoE manager has posted any updates. Thus, the PoE manager and application may either communicate directly through a communication protocol or indirectly using shared memory.

Figure 3:
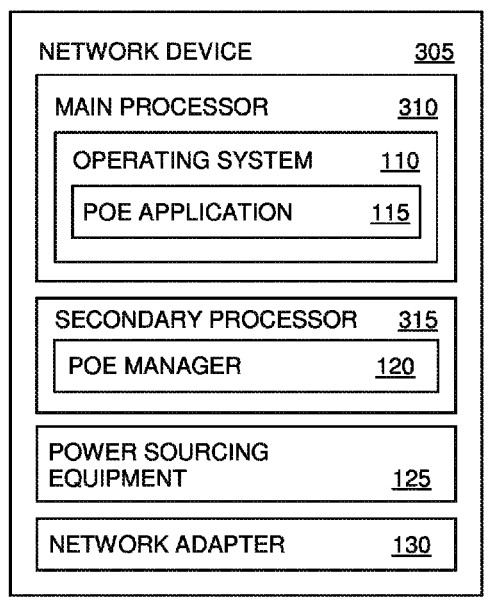
FIG. 3 is a block diagram of a network device with separate PoE modules on separate processors, according to one embodiment described herein.

FIG. 3 is a block diagram of a network device 305 with separate PoE modules on separate processors, according to one embodiment described herein. As shown, network device 305 includes main processor 310 and secondary processor 315. The main processor 310 represents a single processor that may have one or more cores or multiple processors that each may have one or more cores. The main processor 310 includes OS 110 and PoE application 115. As described previously, the OS 110 may maintain the control and data planes that enable the network device 305 to forward data between other network devices and PDs. In addition, the PoE application 115 permits the OS 110 to perform at least one PoE function. The secondary processor 315 includes the PoE manager 120 that, in conjunction with the PoE application, manages the power plane.

The secondary processor 315 is a different integrated circuit (or circuits) than the processing element or elements making up the main processor 310. Like main processor 310, the secondary processor 315 represents a single processor that may have one or more cores or multiple processors that each may have one or more cores. In one embodiment, the secondary processor 315 operates independently of the main processor 310. That is, even if the main processor 310 becomes unavailable (e.g., the main processor 310 is reset), the secondary processor 315 can continue to function. That is, any fate sharing is removed between the processors 310 and 315. For example, the processor 310 and 315 may not be configured in a master-slave relationship where one processor is dependent on the other processor in order to function. Removing the fate sharing between the processors 310 and 315 also enables any fate sharing between the PoE application 115 and PoE manager 120 to be removed.

In one embodiment, the PoE application 115 performs different PoE functions than PoE manager 120. For example, to determine the amount of power to allocate to each PD, the network device 305 may use a data communication protocol such as LLPD or CDP. The main processor 310 may provide access to such data ports while the secondary processor 315 does not. Thus, this PoE function may be assigned to the PoE application 115 since it is executed by the main processor 310 and has access to the data port on the network adapter 130. However, as discussed above, when updating the OS 110 or during failures, the PoE application 115 may become unavailable, thereby preventing the network device from performing the PoE functions assigned to PoE application 115. To prevent power interruptions to the PDs, the PoE functions necessary for maintaining an already configured PoE connection to a PD may be assigned to the PoE manager 120. In one embodiment, the PoE manager 120 includes the logic and hardware necessary to provide power to the PDs (using the PSE 125). Furthermore, the PoE manager 120 may monitor and police the connections to each PD to ensure they do not draw more power than they are allotted. In one embodiment, the PoE manager 120 has the ability to shut down or suspend any PoE connection where the PD draws more power than allocated. Thus, even if the PoE application 115 is unavailable, the PoE manager 120 can police the existing power connections and ensure the PSE 125 does not become overloaded.

Furthermore, by configuring the PoE manager 120 to contain the minimum amount of PoE functions required to maintain and police the PoE connections, the network device may reduce the number of times the PoE manager 120 is upgraded. Because the PoE manager 120 maintains the PoE connections, when the PoE manager 120 becomes unavailable, the network device 305 ceases to provide power to the PDs—i.e., there is a power interruption. By reducing the PoE functions performed by the PoE manager 120, the less likely that any software or firmware in the PoE manager 120 will need to be upgraded. Stated differently, by assigning all the PoE functions not needed to maintain a current PoE connection to the PoE application 115, the likelihood that a particular PoE update will cause the PoE manager 120 to become unavailable is reduced. As mentioned above, updating the PoE application 115 does not cause a power interruption since the network device 305 is able to use the PoE manager 120 to provide power to the PDs allotted power from the PSE 125. In one embodiment, the only PoE functions performed by the PoE manager 120 are providing the allocated power to the PDs using the PSE 125 and policing the PDs to ensure their power consumption is within the allocated limits. The remaining PoE functions may be performed by the OS 110 using the PoE application 115.

Although FIG. 3 illustrates the OS 110 and PoE application 115 being located on the main processor 310, this placement is to illustrate that the OS 110 is executed by the main processor 310 and is not intended to limit the OS 110 or the PoE application 115 to hardware components that are part of the processor 310. Indeed, OS 110 and PoE application 115 may be software or firmware components that are stored in memory as shown in FIG. 1. Nonetheless, parts of the OS 110 and PoE application 115 may be specialized hardware on the main processor 310. Similarly, the PoE manager 120 is shown as being part of the secondary processor 315. In one embodiment, the PoE manager 120 may be a hardware controller that is part of the processor 315. However, in other embodiments, the PoE manager may be software or firmware stored on memory that is executed using the secondary processor 315 rather than the main processor 310.

The main processor 310 may be the same type of processing element as the secondary processor 315 or a different processor. As an example of the latter, the main processor 310 may be a central processing unit that is able to execute any number of different operating system, while the secondary processor 315 may be an application specific integrated circuit (ASIC) for performing one or more predefined functions. For instance, the secondary processor 315 may be an ASIC configured to perform the PoE functions of the PoE manager 120.

Furthermore, even if the main processor 310 and secondary processor 315 are operated independently such that there is no fate sharing between the two processors, the network device 305 may still include a communication channel between the main and secondary processors 310, 315. This communication channel may be used by the PoE application 115 and PoE manager 120 to share information and manage the power plane.

Figure 4:
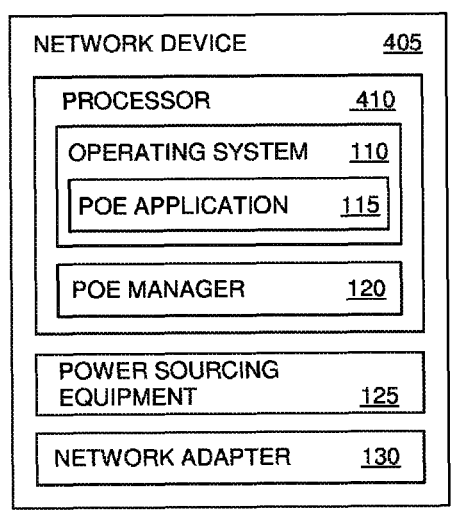
FIG. 4 is a block diagram of a network device with separate PoE modules on the same processor, according to one embodiment described herein.

FIG. 4 is a block diagram of a network device 405 with separate PoE modules on the same processor 410, according to one embodiment described herein. Unlike in FIG. 3 where the PoE application 115 and PoE manager 120 are located on separate processors, here, both are located on the same processor 410. However, the PoE application 115 and PoE manager 120 may be separate processes that operate independently of one another such that there is no fate sharing between the OS 110 and the PoE manager 120. For example, if the OS 110 and/or PoE application 115 fail or are otherwise unavailable, the processor 410 is still capable of performing the PoE functions assigned to the PoE manager 120. In one embodiment, the processor 410 is a multi-core processor where the PoE application 115 is executed on one core and the PoE manager 120 is executed by another one of the cores.

In one embodiment, the PoE application 115 and PoE manager 120 in network device 405 perform different PoE functions. Moreover, in one embodiment, the PoE manager 120 may perform only the minimum number of PoE functions required to maintain a power connection to a PD coupled to the network device 405. As discussed above, doing so may reduce the frequency the PoE manager 120 is updated, and thus, reduce power interruptions.

One advantage of the arrangement shown in network device 405 over network device 305 in FIG. 3 is that network device 405 does not contain separate processors which may reduce cost and complexity of the network device 405. However, one disadvantage of network device 405 is that the processor 410 becomes a point of failure for the power plane. For example, if the firmware used to operate processor 410 is updated, the processor 410 may need to be reset for the changes to take effect. If processor 410 is unavailable, then the PoE manager 120 also becomes unavailable which may cause a power interruption.

Figure 5:
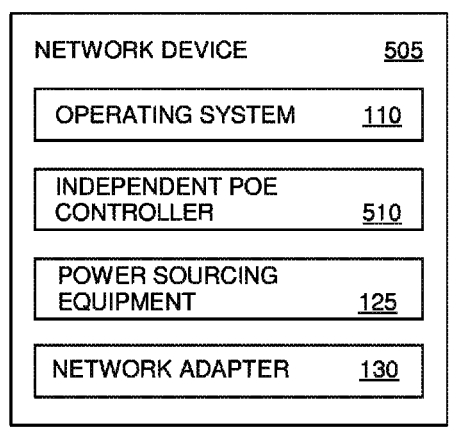
FIG. 5 is a block diagram of a network device with a PoE module independent of the operating system, according to one embodiment described herein.

FIG. 5 is a block diagram of a network device 505 with an independent PoE controller 510, according to one embodiment described herein. In contrast to the embodiments described above, in network device 505, the PoE functions are not divided between the PoE application located in the OS 110 and the PoE manager. Instead, the PoE functions are performed by the PoE controller 510 which is operated independently of the OS 110 such that there is no fate sharing between the two. Stated differently, the OS 110 in network device 505 does not perform any PoE functions, and instead, the network device 505 relies on the PoE controller 510 to, e.g., negotiate power allocation using LLDP/CDP, discover new PDs, provide the allocated power to the PDs, police the PoE connections, and the like. Moreover, although FIG. 5 illustrates the PoE controller 510 as being a single component, in other embodiments, the controller 510 may include multiple PoE modules that are executed on any number of hardware elements.

In one embodiment, OS 110 and PoE controller 510 are executed by different physical processors. For example, a main processor may execute the OS 110 while a secondary processor executes the PoE controller 510. Like in FIG. 3, the processors may be able to communicate but there is no fate sharing between the processor so that the OS 110 and PoE controller 510 may be operated independently. Thus, even if the OS 110 is unavailable, the PoE controller 510 (and the secondary processor) continues to maintain the power plane.

In another embodiment, the OS 110 and PoE controller 510 are executed on the same physical processor like shown in FIG. 4. Nonetheless, the processor maintains OS 110 and PoE controller 510 as separate processes such that the availability of the OS 110 does not affect the ability of the PoE controller 510 to manage the power plane. Thus, even if the data and control plane of the network device 505 are offline, the PoE controller 510 is still able to perform the PoE functions. Stated differently, in this embodiment, all the PoE functions operate independently of the OS 110.

Although not shown, in one embodiment, the PoE controller 510 may be subdivided into different PoE modules (e.g., different software modules or different hardware modules) so that not all updates to the PoE controller 510 result in a power interruption. For example, the minimum number of PoE functions needed to maintain a power connection may be located in a separate module so that any PoE updates that do not affect this module means that the PoE controller 510 can continue to maintain the current PoE connections with the PDs. Regardless how the PoE functions are assigned in the PoE controller 510, because these functions are independent of the OS 110, the network device 505 can continue to provide power to connected PDs even when the OS 110 is unavailable.

Figure 6:
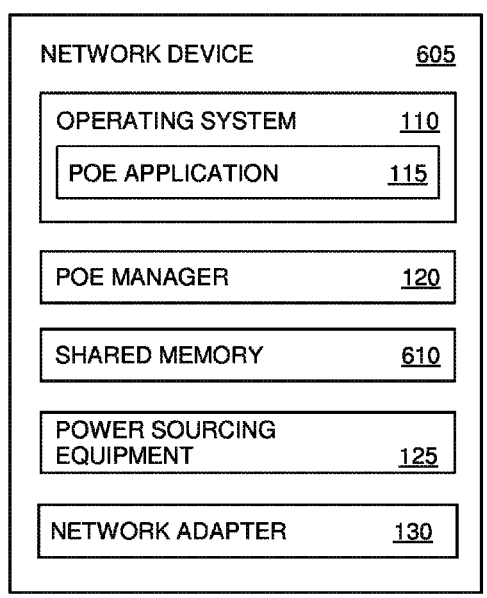
FIG. 6 is a block diagram of a network device with shared memory for communicating between the operating system and a separate PoE module, according to one embodiment described herein.

FIG. 6 is a block diagram of a network device 605 with shared memory 610 for communicating between the OS 110 and the PoE manager 120, according to one embodiment described herein. As shown, the network device 605 includes shared memory 610 which may be volatile memory, non-volatile memory, or combinations thereof. Moreover, shared memory 610 may be located on a processor in the network device 605 or include a separate memory element such as a DRAM chip or a hard disk drive. To communicate using the shared memory 610, the PoE application 115 and PoE manager 120 may post information on the shared memory 610. For example, when the PoE manager 120 detects a new PD is connected to the network device 605, the manager 120 may create a record for the new PD in the shared memory 610 which may identify the PD and the port the PD is connected to. The PoE application 115 may poll the shared memory 610 either at intervals or after receiving a notification to identify the new PD record. The PoE application 115 may then negotiate with the new PD to determine the amount of power its allocated. Once the amount of allocated power is determined, the PoE application 115 may post the power allocation in the shared memory 610 which the PoE manager 120 can then read to determine how much power to deliver to the PD.

Furthermore, in one embodiment, the PoE application 115 may inform the PoE manager when the application 115 will be unavailable. For example, the PoE application 115 may post a notice in the shared memory 610 that the OS 110 is about to perform an update, and thus, the PoE application 115 will be unavailable. Based on this notice, the PoE manager 120 may behave differently. For instance, in one embodiment, the PoE manager 120 may begin to perform tasks that were previously performed by the PoE application 115. Alternatively or additionally, the PoE manager 120 may perform its assigned tasks differently. For example, while the PoE application 115 is available, when a PD is consuming more power than allotted, the PoE manager 120 may post a notice on the shared memory 610 stating how much the PD is over consuming and then wait for an instruction from the PoE application 115 for how to proceed. However, if the PoE application 115 is unavailable, instead of waiting, the PoE manager 120 may instruct the PSE 125 to cease sourcing power to the over-consuming PD. In another example, when the PoE application 115 is available and a connected PD is disconnected and then reconnected to the network device 605, the PoE manager 120 may provide the PD with the same power it was allocated before the PD disconnected. However, if the PoE application 115 is unavailable, the PoE manager 120 may not provide the originally allocated power to the reconnected PD and instead flag the PD in the shared memory 610.

Once the PoE application 115 becomes available, the application 115 may first poll the shared memory 610 to determine what updates may have been posted to the memory 610 while the application 115 was unavailable. Once the PoE application 115 has all the updated information, the application 115 may again resume performing its PoE functions.

Although FIG. 6 illustrates a network device 605 with a shared memory 605, in another embodiment, the PoE application 115 and PoE manager 120 may send and transmit data messages without using the shared memory 605 as an intermediary. For example, the network device 605 may include a communication link (e.g., a system bus) between the PoE manager 120 and OS 110 which enable the PoE application 115 and PoE manager 120 to share data as described in the embodiments above. However, if the PoE application 115 is unavailable, the PoE manager 120 may queue its data messages and send the messages on the communication link once the manager 120 determines that the PoE application 120 is again available.

In the preceding, reference is made to embodiments presented in this disclosure. However, the scope of the present disclosure is not limited to specific described embodiments. Instead, any combination of the described features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

As will be appreciated by one skilled in the art, the embodiments disclosed herein may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium is any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality and operation of possible implementations of systems, methods and computer program products according to various embodiments. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In view of the foregoing, the scope of the present disclosure is determined by the claims that follow.

We claim:

1. A Power-over-Ethernet (PoE) enabled network device, comprising:
   power sourcing equipment (PSE) configured to provide DC power to powered devices (PDs);
   an operating system configured to:
      maintain a data plane for routing data, and
      maintain, at least in part, a power plane for supplying the DC power to the PDs; and
   a PoE manager configured to:
      maintain, at least in part, the power plane, wherein the PoE manager being independently operable from the operating system such that when the operating system is unavailable, the PoE manager still supplies the DC power to the PDs using the PSE,
      log a PoE event occurring during a time the operating system is unavailable, and
      inform the operating system of the PoE event upon determining the operating system becomes available, wherein the operating system performs a first PoE function and the PoE manager performs a second, different PoE function.

2. The network device of claim 1, wherein the operating system further comprises a PoE application configured to maintain, at least in part, the power plane.

3. The network device of claim 1, wherein:
   the first PoE function comprises allocating an amount of power to be provided to the PDs; and
   the second PoE function comprises providing power to the PDs using the PSE.

4. The network device of claim 1, wherein the PoE event comprises at least one of a PD disconnecting from the network device or a PD connecting to the network device.

5. The network device of claim 2, wherein the PoE manager is operated independently of the PoE application in the operating system such that when the PoE application is unavailable, the PoE manager still supplies power to the PDs using the PSE.

6. The network device of claim 2, further comprising:
   a first processor configured to execute the operating system and the PoE application; and
   a second processor configured to perform the second PoE function of the PoE manager, wherein the first and second processors are operated independently such that when the first processor is unavailable, the second processor continues to perform the second PoE function of the PoE manager.

7. The network device of claim 2, wherein the PoE application performs the first PoE function; and the first PoE function of the PoE application and the second PoE function of the PoE manager are performed by a same processor, wherein, when the PoE application is unavailable, the same processor is configured to continue to perform the second PoE function of the PoE manager such that DC power is supplied to the PDs.

8. The network device of claim 2, further comprising:

a shared memory accessible by both the PoE application and the PoE manager, wherein the PoE application and PoE manager are configured to exchange information related to the PoE event using the share memory.

9. A PoE system, comprising:

a PD;

an Ethernet cable;

a PoE enabled network device coupled to the PD via the Ethernet cable, the network device comprising:

PSE configured to provide DC power to the PD via the Ethernet cable;

an operating system configured to:

maintain a data plane for routing data to the PD using the Ethernet cable, and maintain, at least in part, a power plane for supplying the DC power to the PD; and a PoE manager configured to:

maintain, at least in part, the power plane, wherein the PoE manager being independently operable from the operating system such that when the operating system is unavailable, the PoE manager still supplies the DC power to the PD using the PSE, log a PoE event occurring during a time the operating system is unavailable, and inform the operating system of the PoE event upon determining the operating system becomes available.

10. The PoE system of claim 9, wherein the operating system further comprises a PoE application configured to maintain, at least in part, the power plane.

11. The PoE system of claim 10, wherein the PoE manager is operated independently of the PoE application in the operating system such that when the PoE application is unavailable, the PoE manager still supplies power to the PD using the PSE.

12. The PoE system of claim 10, wherein the network device comprises:

a first processor configured to execute the operating system and the PoE application; and a second processor configured to perform a first PoE function of the PoE manager, wherein the first and second processors are operated independently such that when the first processor is unavailable, the second processor continues to perform the second PoE function of the PoE manager.

13. The PoE system of claim 10, wherein the PoE application performs a first PoE function; and the first PoE function of the PoE application and a second PoE function of the PoE manager are performed by a same processor, wherein, when the PoE application is unavailable, the same processor is configured to continue to perform the second PoE function of the PoE manager such that DC power is supplied to the PD.

14. The PoE system of claim 10, wherein the network device comprises:

a shared memory accessible by both the PoE application and the PoE manager, wherein the PoE application and PoE manager are configured to exchange information related to managing the power plane using the share memory.

15. A method, comprising:

determining an allocation of power for a PD coupled to a network device using an operating system of the network device, wherein the operating system maintains, at least in part, a power plane for supplying DC power to the PD and a data plane for routing data;

providing the allocated power to the PD using a PoE manager and PSE in the network device, wherein the PoE manager maintains, at least in part, the power plane;

operating the PoE manager independently of the operating system such that when the operating system is unavailable, the PoE manager and PSE continue to provide the DC power to the PD;

logging a PoE event occurring during a time the operating system is unavailable at the PoE manager; and informing the operating system of the PoE event upon determining the operating system becomes available.

16. The method of claim 15, wherein the operating system further comprises a PoE application configured to maintain, at least in part, the power plane.

17. The method of claim 16, further comprising:

operating the PoE manager independently of the PoE application such that when the PoE application is unavailable, the PoE manager and PSE continue to provide the DC power to the PD.

18. The method of claim 16, wherein a first processor executes the operating system and the PoE application and a second processor performs the function of the PoE manager, the method further comprising:

operating the second processor independently of the first processor such that when the first processor is unavailable, the second processor continues to perform the function of the PoE manager.

19. The method of claim 16, wherein the PoE application and the function of the PoE manager are performed by a same processor, wherein, when the PoE application is unavailable, the same processor continues to perform the function of the PoE manager such that the DC power is supplied to the PD during a time when the PoE application is unavailable.

20. The method of claim 16, further comprising logging a status change of the PD occurring during a time the PoE application is unavailable using the PoE manager; and updating the PoE application based on the status change once the PoE application becomes available.

* * * * *